(12) United States Patent
Pescatore et al.

(10) Patent No.: US 9,058,654 B2
(45) Date of Patent: Jun. 16, 2015

(54) METHOD FOR REDUCING NOISE IN A SEQUENCE OF FLUOROSCOPIC IMAGES BY TEMPORAL AND SPATIAL FILTERING

(75) Inventors: Jérémie Pescatore, La Frette (FR); Carole Amiot, Grenoble (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/234,292

(22) PCT Filed: Jul. 20, 2012

(86) PCT No.: PCT/EP2012/064347
§ 371 (c)(1),
(2), (4) Date: Feb. 21, 2014

(87) PCT Pub. No.: WO2013/014110
PCT Pub. Date: Jan. 31, 2013

(65) Prior Publication Data
US 2014/0153842 A1 Jun. 5, 2014

(30) Foreign Application Priority Data

Jul. 22, 2011 (FR) ...................... 11 02306

(51) Int. Cl.
G06K 9/00 (2006.01)
G06K 9/40 (2006.01)
G06T 5/00 (2006.01)

(52) U.S. Cl.
CPC ....... *G06T 5/002* (2013.01); *G06T 2207/10121* (2013.01); *G06T 2207/20012* (2013.01); *G06T 2207/20016* (2013.01); *G06T 2207/20182* (2013.01); *G06T 2207/30004* (2013.01)

(58) Field of Classification Search
None
See application file for complete search history.

(56) References Cited

U.S. PATENT DOCUMENTS 6,018,600 A * 1/2000 Levin et al. ............. 382/284
(Continued)

FOREIGN PATENT DOCUMENTS

EP 2151193 A1 2/2010
WO 2009-100032 A1 8/2009

OTHER PUBLICATIONS

In M. Hensel et al., "Motion and noise detection for adaptive spatio-temporal filtering of medical X-ray image sequences", Proceedings MIUA, Jul. 2005.*

(Continued)

*Primary Examiner* — Andrae S Allison
(74) *Attorney, Agent, or Firm* — Baker Hostetler LLP

(57) ABSTRACT

In the field of medical imaging using fluoroscopy, a method for reducing noise in a sequence of fluoroscopic images acquired by an X-ray detector comprises for each image ($x_n$) of the sequence: applying temporal filtering to the image ($x_n$) at instant n, the temporal filtering comprising fluoroscopic noise reduction processing; applying spatial filtering to the image ($y_n$) at instant n, the spatial filtering comprising: transforming the image ($y_n$) acquired at the instant n from the spatial domain into the curvelet domain using a curvelet transform, each transformed image being represented by a set of coefficients, thresholding the coefficients of the image ($y_n$) using a thresholding function, the thresholding function cancelling the coefficients below a third predetermined threshold, and preserving or adjusting the coefficients above the third predetermined threshold, transforming the image ($Z_n$) whose coefficients have been thresholded from the curvelet domain into the spatial domain using an inverse curvelet transform.

13 Claims, 3 Drawing Sheets

(56) References Cited

U.S. PATENT DOCUMENTS

| | | | | |
|---|---|---|---|---|
| 6,151,417 | A | * | 11/2000 | Florent ......................... 382/265 |
| 6,281,942 | B1 | * | 8/2001 | Wang ............................ 348/607 |
| 6,314,160 | B1 | * | 11/2001 | Dhawale et al. ............. 378/98.2 |
| 6,335,990 | B1 | * | 1/2002 | Chen et al. .................... 382/261 |
| 6,907,143 | B2 | * | 6/2005 | Ferguson ....................... 382/261 |
| 7,542,622 | B1 | | 6/2009 | Angelini et al. |
| 7,840,625 | B2 | * | 11/2010 | Candes et al. ................. 708/402 |
| 8,942,454 | B2 | * | 1/2015 | Wen et al. ..................... 382/131 |
| 2007/0038691 | A1 | * | 2/2007 | Candes et al. ................ 708/400 |
| 2010/0061656 | A1 | * | 3/2010 | Wiemker ....................... 382/275 |
| 2010/0165207 | A1 | * | 7/2010 | Deng et al. .................... 348/620 |

OTHER PUBLICATIONS

Liu Jinping; Gui Weihua; Tang Zhaohui; Mu Xuemin; Zhu Jianyong, "Spatial-temporal method for image denoising based on BLS-GSM in Curvelet transformation," Control Conference (CCC), 2012 31st Chinese , pp. 4027,4032, Jul. 25-27, 2012.*

E. J. Candes, L. Demanet, D. L. Donoho, et al. "Fast discrete Curvelet transforms", Multiscale Modeling & Simulation, vol. 5, No. 3, 2006.*

Tomic, M., Loncaric, S. and Sersic,D. "Adaptive spatio-temporal denoising of fluoroscopic x-ray sequences," Biomedical signal Processing Control 7(2), 173-179 (2011).*

Search Report dated Aug. 17, 2012 from International Patent Application No. PCT/EP2012/064347.

* cited by examiner

METHOD FOR REDUCING NOISE IN A SEQUENCE OF FLUOROSCOPIC IMAGES BY TEMPORAL AND SPATIAL FILTERING

CROSS-REFERENCE TO RELATED APPLICATIONS

This application is a National Stage of International patent application PCT/EP2012/064347, filed on Jul. 20, 2012, which claims priority to foreign French patent application No. FR 1102306, filed on Jul. 22, 2011, the disclosures of which are incorporated by reference in their entirety.

FIELD OF THE INVENTION

The invention relates to the field of X-ray imaging and, more specifically, that of medical imaging using fluoroscopy. It relates to a method for reducing noise in a sequence of fluoroscopic images acquired by an X-ray detector.

In the field of medical imaging, X-ray fluoroscopy imaging makes it possible to provide a doctor with a stream of images of a patient during so-called minimally invasive surgical interventions, for example chemo-embolization of the liver, vertebroplasty, catheterization of aneurisms or the treatment of vascular narrowing. The images can notably help to guide surgical instruments. An intervention guided by fluoroscopy is typically performed by inserting a catheter into the vascular network of the patient. A contrast agent may or may not have been previously injected into the vascular network in order to opacify it and improve the visibility of the vessels. Such an intervention is generally relatively long and the dose of X-rays to which the patient is subjected must be limited in order to avoid giving rise to lesions or tissue burns. Due to this limitation of the dose of X-rays used, the fluoroscopic images obtained have a relatively high level of noise, and therefore a relatively low contrast-to-noise ratio, making the images hard to read.

Filtering processing is implemented in order to lessen the quantum noise present in these images and increase their contrast-to-noise ratio.

Processing known by the name fluoroscopic noise reduction processing, or FNR processing, is thus generally performed on the images acquired by the X-ray detector. The objective of this FNR processing is to filter the noise present in the image while preserving the contrast for the information present in this image. FNR processing is performed by applying a temporal filter to the regions of the images where there is no movement. The existence or the absence of movement in regions of the image is detected on the basis of the individual variation in the intensity of each of the pixels considered separately. A pixel is considered as being in movement when its intensity variation between two images exceeds a threshold related to the standard deviation of the noise. These pixels determined as being in movement are not filtered, or are filtered very little. On the other hand, recursive temporal filtering processing is applied to the pixels determined as being fixed. The FNR processing exhibits the advantage of not coloring the noise spatially. In other words, it does not cause fictitious objects to appear that result from groupings of pixels of similar intensity. However, FNR processing offers relatively limited noise reduction capability and tends to make the objects of interest disappear from the image.

Compared with FNR processing by temporal filtering, spatial filtering processing exhibits beneficial properties. Among the different variants of spatial filtering processing, filtering by transforming the image into the wavelet domain is one of the most commonly used techniques. Wavelet theory, introduced in the 1980s, was developed from the Fourier transform. The Fourier transform is used to describe many physical phenomena. Specifically, it forms an effective mathematical tool for describing many physical phenomena, notably the physical phenomena modeled by steady-state signals. On the other hand, the representations of the physical phenomena modeled by non-steady-state signals are generally unsatisfactory. In particular, the Fourier transform is incapable of localizing the portions of the signal where the frequency changes suddenly. To remedy this, a windowed Fourier transform was developed. It consists in multiplying the signal by a window of given dimension. The analysis therefore becomes local, the dimension of the window determining the temporal resolution obtained, or the spatial resolution in the case of two-dimensional signals. Wavelet theory is based on the windowed Fourier transform. It differs from it by allowing a change in the window dimension during the transform. For this reason, the terms multi-resolution analysis or multi-scale analysis are used. Another difference is that the signal is no longer decomposed into a sum of sines and cosines, but rather in accordance with functions called "wavelets". Wavelets offer the advantage of transforming the image into a so-called sparse representation. Sparse representation is understood to mean a representation requiring a small number of parameters to represent the image faithfully. However, wavelets are poorly suited to the representation of line-type discontinuities, such as object outlines, because their shape does not allow them to make use of the shape of the objects. As a consequence, the information on these discontinuities is contained in the coefficients of numerous scales. To obtain a small reconstruction error, it is therefore necessary to calculate a large number of coefficients, incurring a high computation cost. For a fluoroscopy application where the images must be processed "in real time", i.e. within time periods below the refresh period of the images, this computation cost involves considerable hardware resources.

Other theories have been developed to reduce the redundancy of the information. These notably include isotropic and anisotropic wavelets, or else dual trees, orthogonal or otherwise.

At the beginning of the 2000s, curvelet theory appeared. This theory is also based on the principle of multi-scale analysis. The geometry of curvelets allows them to take advantage of the regularity of object outlines. An image can thus be represented by a relatively small number of coefficients. However, the curvelet transform has the drawback of introducing artifacts into the image, notably spatial coloration of the noise. The introduction of artifacts is all the stronger when the contrast-to-noise ratio is low. However, in the field of fluoroscopy imaging, the contrast-to-noise ratio is often less than 1. The presence of artifacts therefore appears inevitable and has until now limited its use to images with a much higher contrast-to-noise ratio.

SUMMARY OF THE INVENTION

One object of the invention is notably to propose noise reduction suited to fluoroscopic images with a relatively low contrast-to-noise ratio. In particular, the noise reduction processing must exhibit a high noise reduction capability, generate a low computation cost, limit the loss of objects of interest from the image and not introduce any artifacts. With this aim, the subject of the invention is a method for reducing the noise in a sequence of fluoroscopic images acquired by an X-ray detector, each image being formed in the spatial domain by a matrix of pixels, each pixel having a value representative of a signal level, the method comprising the following successive steps for each image:

applying temporal filtering to the image acquired at an instant n, the application of said temporal filtering having the following substeps for each pixel of the image:
determining a difference between the value of the pixel considered in the image acquired at the instant n and the value of the corresponding pixel in the image acquired at an instant n−1 to which the temporal filtering has been applied,
if the difference is below a first predetermined threshold, correcting the value of the corresponding pixel with a first set of parameters,
if the difference is above a second predetermined threshold, correcting the value of the corresponding pixel with a second set of parameters,
applying spatial filtering to the image acquired at the instant n, the application of said spatial filtering comprising the following substeps:
transforming the image acquired at the instant n from the spatial domain into the curvelet domain using a curvelet transform, each image in the curvelet domain being represented by a set of coefficients,
thresholding the coefficients of the image using a thresholding function, the thresholding function cancelling the coefficients below a third predetermined threshold, and preserving or adjusting the coefficients above the third predetermined threshold,
transforming the image whose coefficients have been thresholded from the curvelet domain into the spatial domain using an inverse curvelet transform.

The step of transforming the image acquired at the instant n into the curvelet domain advantageously uses a curvelet transform with 6 or 9 scales, and/or 16 orientations.

In a first particular embodiment, the step of transforming the image acquired at the instant n into the curvelet domain uses a discrete curvelet transform via USFFT.

In a second particular embodiment, the step of transforming the image acquired at the instant n into the curvelet domain uses a discrete curvelet transform via wrapping.

The thresholding function of the spatial filtering can be a hard thresholding function, i.e. a thresholding function according to which the coefficients are cancelled if they are below the third predetermined threshold, and preserved otherwise.

The third predetermined threshold $T_S$ of the spatial filtering can be determined by the following successive steps:
creating an image Y of the same dimensions as the image acquired at the instant n and of uniform value 1 over all pixels,
transforming the image Y using a Fourier transform,
normalizing the amplitude F of the peak in the Fourier transform of the image Y using the relationship:

$$|F| = \frac{6}{5} \frac{F}{\sqrt{M \times P}}$$

where M and P denote the dimensions of the image Y,
transforming the Fourier transform of the image Y from the spatial domain into the curvelet domain using a curvelet transform, each image in the curvelet domain being represented by a set of coefficients $c_{j,l,k}^Y$,
determining a norm $\hat{c}_{j,l}^Y$ for the coefficients $c_{j,l,k}^Y$ using the relationship:

$$\hat{c}_{j,l}^Y = \sqrt{\frac{\sum_l |c_{j,l,k}^Y|^2}{M \times P}}$$

where M and P denote the dimensions of the image Y and l denotes the orientations of the curvelets,
determining the predetermined threshold $T_S$ using the relationship:

$$T_S = r \cdot \hat{c}_{j,l}^Y \cdot \sigma$$

where σ is the standard deviation of the noise in the image acquired at the instant n and to which the temporal filtering has been applied, and where the factor r takes the value 0 for the coarsest scale of the curvelets, the value 4 for the finest scale and the value 1 for the other scales.

In one particular embodiment, the step of applying the temporal filtering to the image acquired at the instant n comprises, following the substep of determining the difference between the value of the pixel in question in the image acquired at the instant n and the value of the corresponding pixel in the image acquired at the instant n−1 to which the temporal filtering has been applied, the following additional substep:
if the difference lies between the first predetermined threshold and the second predetermined threshold, correcting the value of the corresponding pixel with a third set of parameters.

In summary, the noise reduction method according to the invention successively has temporal filtering and spatial filtering by curvelet transformation. The order in which the filtering is carried out is important with regard to the coloration of the noise. This is because spatial filtering by curvelet transformation introduces artifacts if it is not preceded by temporal filtering. Moreover, the invention notably has the advantage of not requiring any shapes a priori for the spatial filtering.

BRIEF DESCRIPTION OF THE DRAWINGS

The invention will be better understood, and other advantages will become apparent, on reading the following description, made with reference to the appended drawings in which.

Figure 1:
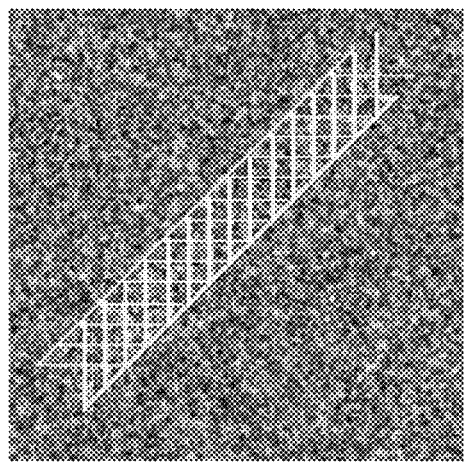
FIG. 1 represents an example of points taken into account to determine the contrast of an object in a fluoroscopic image.

For the remainder of the description, we shall consider a sequence of fluoroscopic images $x_n$ acquired by an X-ray detector, where n denotes the various instants of acquisition in the sequence. Each image is composed of a matrix of pixels each having a value $x_n(m,p)$ representative of a signal level, with m and p respectively denoting the row and the column of the matrix. The value is for example a numerical value between 0 and 255. The numerical value is thus encoded on 8 bits. It can also be encoded on 14 bits. The contrast-to-noise ratio (CNR) is defined as follows:

$$CNR = \frac{|contrast - noise|}{\sigma}$$

where the noise is preferably determined over a region of the image where they are no objects of interest, where the contrast is preferably determined from points corresponding to an object of interest in the image, and where σ denotes the standard deviation of the noise, i.e. the standard deviation of the pixel values corresponding to a region of the image not containing any objects of interest. FIG. 1 shows the points considered (in white) to determine the contrast of a vascular endoprothesis, better known by the name "stent".

Figure 2:
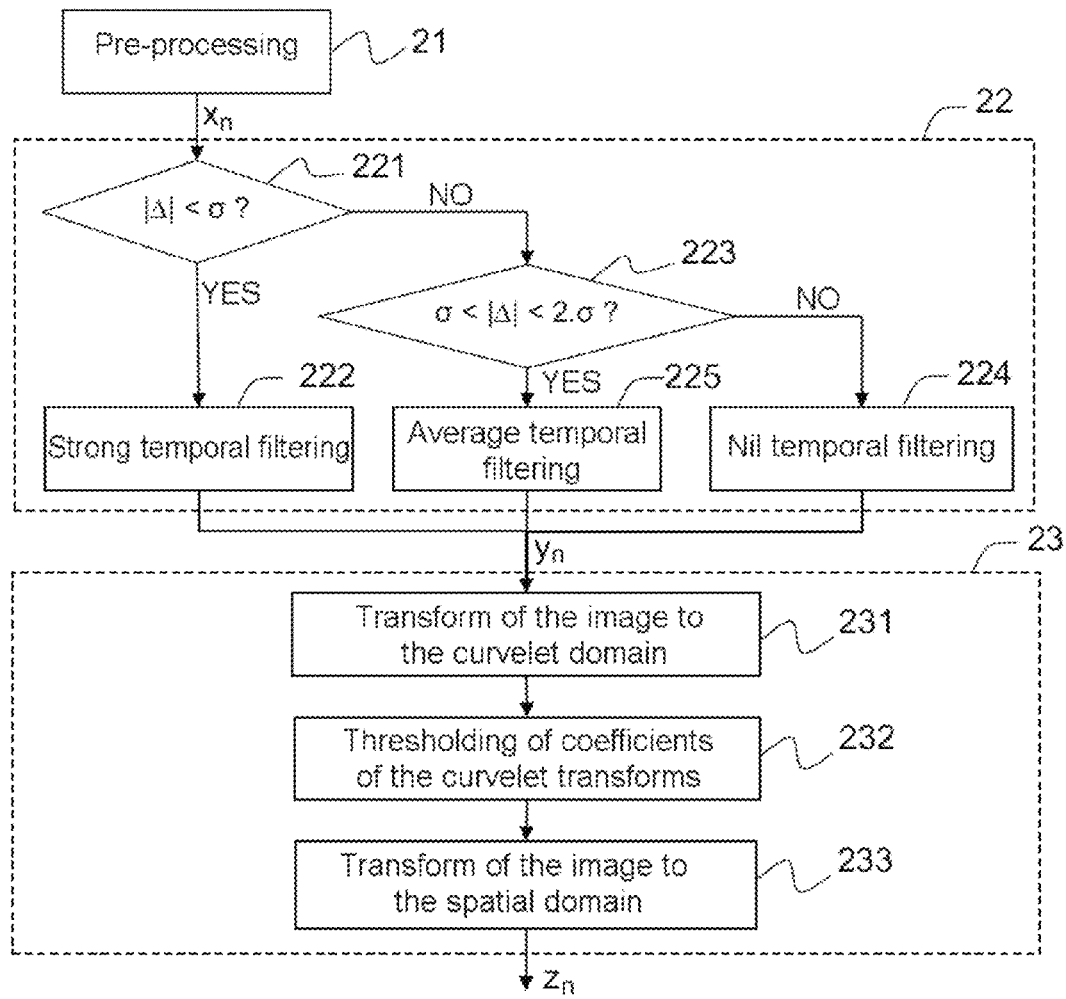
FIG. 2 represents possible steps of the method for reducing noise according to the invention.

FIG. 2 shows possible steps of the method for reducing noise in the sequence of fluoroscopic images. The method is described for the image $x_n$ acquired at the instant n. It can however be applied successively to each of the images of the sequence.

In a first step 21, the image $x_n$ is processed by a pre-processing chain. The pre-processing may notably comprise groupings of adjacent pixels in the image. For example, the pixels can be grouped as a function of the desired resolution or of the desired noise level. The pre-processing can also comprise a phase of calibration of the X-ray detector. In particular, the gain and the offset to be applied to each pixel of the detector can be determined. Furthermore, the calibration can also comprise an identification of the pixels taking a random value or a constant value whatever the radiation received. These faulty pixels can be corrected by interpolating their value using the values of neighboring pixels. The pre-processing can also comprise a rescaling of the images, i.e. a global adjustment of the value of all the pixels of each image, in such a way that the average value of the pixels is constant for all the images of the sequence. Finally, the pre-processing can comprise a substep of adapting the images. Given the physics of X-rays, the noise present in each image $x_n$ is Poisson noise. Now, such noise is poorly suited to noise reduction processing. In addition, each image $x_n$ is an image representative of the attenuations of the X-rays, whereas an image of radiological thicknesses is a more natural choice for analysis. Ascombe's formula makes it possible to obtain an image of the radiological thicknesses with Pseudo-Gaussian noise:

$$x_n(m, p) = 2\sqrt{x_{0,n}(m, p) + \frac{3}{8}}$$

where $x_{0,n}(m,p)$ is the value of the pixel (m,p) before the substep of adapting the image $x_n$.

In a second step 22, the image $x_n$ is filtered by a temporal filter. The temporal filtering is for example a filtering called "fluoroscopic noise reduction" (FNR). This filtering is notably described in the patent U.S. Pat. No. 6,314,160 B1. Let $y_n$ be the image $x_n$ obtained after the temporal filtering. $\Delta(m,p)$, denotes the difference between the value $x_n(m,p)$ in the image $x_n$ acquired at the instant n, and the value $y_{n-1}(m,p)$ in the filtered image $y_{n-1}$ corresponding to the acquisition at the instant n−1:

$$\Delta(m,p) = x_n(m,p) - y_{n-1}(m,p)$$

To simplify notation, $x_n$ will simply denote the value of a pixel of the image $x_n$, $y_n$ the value of a pixel of the image $y_n$ and $\Delta$ the difference between the two values $x_n$ and $y_{n-1}$ of the pixel in question. FNR filtering can be divided into two modes, called adaptive mode and non-adaptive mode. The adaptive mode is so called because it takes into account the movement of objects. FNR filtering consists in comparing, pixel-by-pixel, the difference $\Delta$ at preset thresholds. The first threshold $S_1$ corresponds to a relatively small difference $\Delta$. The second threshold $S_2$ corresponds to a relatively large difference $\Delta$. The FNR filtering is then parameterized by coefficients $\alpha$ and $\beta$ as a function of the result of this difference $\Delta$ and of the mode in question. $\alpha$ denotes the strength of the filter:

$$a = \frac{\sigma_y^2}{\sigma_y^2 + \sigma_x^2}$$

where $\sigma_x$ is the standard deviation in the image $x_n$ and where $\sigma_y$ is the standard deviation in the image $y_{n-1}$.

The constants AA, BB, CC and DD are defined as follows:

$$AA = \frac{1-a}{2 \cdot \sigma_x}$$

$$BB = 2a - 1$$

$$CC = \frac{\sigma(1-a)}{2}$$

$$DD = \frac{3}{2}\sigma(1-a)$$

For the adaptive mode, the thresholds $S_1$ and $S_2$ are defined as follows:

$S_1 = \sigma$ $S_2 = 2\sigma$ and the coefficients $\alpha$ and $\beta$ are determined as follows:

$$\text{if } |\Delta| < S_1, \quad \begin{cases} \alpha = a \\ \beta = 0 \end{cases}$$

$$\text{if } S_1 < |\Delta| < S_2, \quad \begin{cases} \alpha = \dfrac{AA \cdot \Delta^2 + BB \cdot |\Delta| + CC}{|\Delta|} \\ \beta = 0 \end{cases}$$

$$\text{otherwise}, \quad \begin{cases} \alpha = 1 - \dfrac{DD}{|\Delta|} \\ \beta = 0 \end{cases}$$

For the non-adaptive mode, the thresholds $S_1$ and $S_2$ are defined as follows:

$$S_1 = 2\sigma$$

$$S_2 = \frac{2 \cdot \sigma}{\sqrt{a}}$$

and the coefficients $\alpha$ and $\beta$ are determined as follows:

$$\text{if } |\Delta| < S_1, \quad \begin{cases} \alpha = a \\ \beta = 0 \end{cases}$$

$$\text{if } S_1 < |\Delta| < S_2, \begin{cases} \alpha = \dfrac{a \cdot \Delta^2}{3(2 \cdot \sigma)^2} \\ \beta = \dfrac{4}{3}\sigma \cdot a \end{cases}$$

$$\text{otherwise,} \begin{cases} \alpha = 1 \\ \beta = \dfrac{a}{3} - \dfrac{4 \cdot \sigma}{\sqrt{a}} \end{cases}$$

FNR filtering actually consists in determining a new value $y_n$ for each pixel of the image on the basis of its value $x_n$ and of the coefficients $\alpha$ and $\beta$:

$$y_n = \alpha \cdot x_n + (1-\alpha) y_{n-1} + \beta$$

In other words, the value $x_n$ of each pixel is corrected on the basis of the coefficients $\alpha$ and $\beta$. In FIG. 2, the FNR filtering step 22 is represented for the adaptive mode. By way of example, in a first substep 221, the absolute value of the difference $\Delta$ is compared, for each pixel $x_n$, with the threshold $S_1$, namely the standard deviation $\sigma$. If the absolute value of the difference $\Delta$ is below the threshold $S_1$, the pixel in question probably represents a noise level and so-called strong filtering is applied in a substep 222 with the corresponding parameters. Otherwise, in a substep 223, the absolute value of the difference $\Delta$ is compared, for each pixel $x_n$, with the threshold $S_2$, namely $2\sigma$. If the absolute value of the difference $\Delta$ is above the threshold $S_2$, the pixel in question probably corresponds a point of the object that has moved and so-called weak filtering is applied in a substep 224 with the corresponding parameters. Finally, if the absolute value of the difference $\Delta$ lies between the thresholds $S_1$ and $S_2$, an uncertainty exists. In order to obtain a continuous function between the strong filtering and the weak filtering, average filtering is applied in a substep 225 with the corresponding parameters.

In a third step 23, the image $y_n$ obtained after temporal filtering is filtered by a spatial filter based on a curvelet transform. Curvelet theory uses the principle of multi-resolution or multi-scale spaces, a scale corresponding to a partition level of the space. The space is partitioned into curvelets whose envelopes have the dimensions $2^j \times 2^{j/2}$, where j is a positive integer denoting the scale. Each curvelet depends on the number of scales in question, on its position in the image and on its orientation. For each scale, the best possible approximation of the image is calculated. From one scale to the other, only the improvements obtained are represented. The number of scales determines the quality of the reconstruction of the image. With curvelets, a number of scales comprised between 6 and 10 makes it possible to provide very satisfactory results in terms of contrast-to-noise ratio.

In a first substep 231 of the spatial filtering step 23, the image $y_n$ is transformed from the spatial domain into the curvelet domain by a curvelet transform. Preferably, a discrete curvelet transform is used. Such a transform is notably described in E. Candès, Demanet L., Donoho D. and Ying L., "Fast Discrete Curvelet Transforms", Multiscale Model. Simul., vol. 5, no. 3, 2006, pp. 861-899. In their discrete form, curvelets cannot be sampled with Fourier space grids. The document by Donoho et al thus proposes two solutions for translating curvelets of given scale and orientation onto the spatial grid. A first solution for transforming the image into the discrete curvelet domain is called discrete curvelet transform via USFFT, where USFFT stands for "unequally-spaced fast Fourier transform". In this solution, the translation grid is inclined in such a way as to be aligned with the direction of the curvelets at given scale and angle. A second solution is called discrete curvelet transform via wrapping. In this solution, the translation grid is identical for all the angles of a given quadrant at a given scale. This implies that the number of angles used for the transform is a multiple of 4. The curvelet transform via USFFT is more faithful to continuous curvelet theory than the curvelet transform via wrapping. However, its computation cost is higher. In both solutions, the curvelet transform of the image $y_n$ can be represented by a set of coefficients $c_n^D(j,l,k)$ where the exponent D refers to the discrete transform, and where j, l and k respectively denote the scale, the orientation and the position of the curvelet in question. In a preferred embodiment of the spatial filter, the number of scales used is equal to 9. In another embodiment, the number of scales used is equal to 6. The latter embodiment implies a smaller number of coefficients to compute and therefore a shorter processing time. Moreover, the number of orientations used is advantageously equal to 16. This number represents a good compromise between resolution in orientation and curvelet computation cost, notably for real images the curves of which require a large number of orientations to be approached. Additionally, since the number 16 is a multiple of 4, it facilitates curvelet transform via wrapping.

In a second substep 232 of the spatial filtering step 23, the coefficients $c_n^D(j,l,k)$ of the image $y_n$ are thresholded by a thresholding function. The thresholding step 232 is based on the hypothesis that certain coefficients $c_n^D(j,l,k)$ represent noise whereas others contain useful information. The thresholding step 232 therefore consists in identifying and removing coefficients that do not contain useful information. The thresholding function is characterized on the one hand by its shape and on the other hand by its threshold T. Two main thresholding functions exist, the so-called soft thresholding function and the so-called hard thresholding function. By simplifying the notation of the coefficients to $c_n$ and calling the thresholded coefficients $\hat{c}_n$, the hard thresholding function can be modeled as follows:

$$\hat{c}_n = \begin{cases} 0 & \text{if } |c_n| \leq T \\ c_n & \text{otherwise} \end{cases}$$

The soft thresholding function can be modeled as follows:

$$\hat{c}_n = \begin{cases} 0 & \text{if } |c_n| \leq T \\ c_n - T \cdot \text{sign}(c_n) & \text{otherwise} \end{cases}$$

Figure 3A:
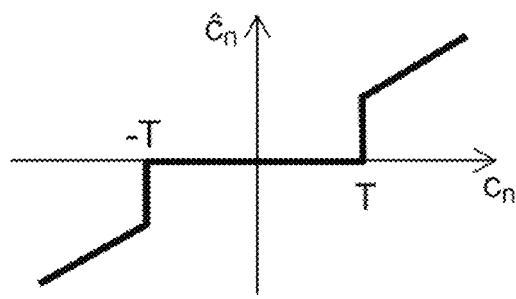
FIGS. 3A and 3B respectively represent, by curves, a hard thresholding function and a soft thresholding function.
Figure 3B:
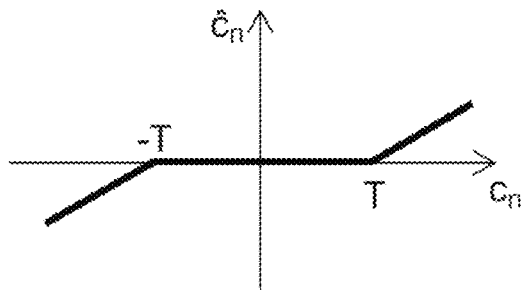

FIG. 3A represents the hard thresholding function by a curve 31 and FIG. 3B represents the soft thresholding function by a curve 32. The soft thresholding function has a greater noise reduction capability than the hard thresholding function. On the other hand, it modifies the value of the pixels as a function of the threshold T chosen. The results in a loss of precision in certain details of the image. The determination of the threshold T is a crucial step because it determines the performance of the spatial filtering, as much in the noise reduction capability as in the introduction of artifacts.

In a first embodiment, the threshold T is determined as being the universal threshold $T_U$ notably described in D. L. Donoho and Johnstone, I. M., "Ideal spatial adaptation via wavelet shrinkage", Biometrica, vol. 81, 1994, pp. 425-455. This threshold $T_U$ is defined by the following relationship:

$$T_U = \sigma \sqrt{2 \frac{\log N}{N}}$$

where N is the number of samples, i.e. here the number of pixels in the image $y_n$. The universal threshold $T_U$ is not optimal and can introduce artifacts. Nevertheless, thresholds proportional to the universal threshold $T_U$ can obtain good results if the proportionality factor is well chosen.

In a second embodiment, the threshold T is determined by the method described in J. L. Starck, Candès I. J. and Donoho L., "The Curvelet Transform for Image Denoising", IEEE Transactions on Image Processing, vol. 11, no. 6, 2002, pp. 670-684. This method consists in creating an image, denoted Y, of the same dimensions as the image $y_n$ to be denoised and of uniform value 1 over all the pixels. The image Y is transformed by Fourier transform. The frequency of coordinates (0,0) in the image Y is centered and its amplitude is normalized by the dimensions of the image. Let F be the amplitude of the central frequency. Its normalized amplitude, denoted |F|, is for example obtained using the following relationship:

$$|F| = \frac{6}{5} \frac{F}{\sqrt{M \times P}}$$

where M and P denote the dimensions of the image Y, i.e. of the image $x_n$ and of the image $y_n$ equally.

An image is thus obtained with a Dirac peak centered on the image, the amplitude of which is a function of the dimensions of the image. The threshold of this method, denoted $T_S$ depends on the scale j and on the orientation l. It is determined as a function of the norm of the coefficients $c_{j,l,k}^Y$ of the curvelets of the image Y for a given scale j and orientation l. This norm $\hat{c}_{j,l}^Y$ is determined by the following relationship:

$$\hat{c}_{j,l}^Y = \sqrt{\frac{\sum_l |c_{j,l,k}^Y|^2}{M \times P}}$$

The thresholding function is a hard thresholding function, defined as follows:

$$\hat{c}_n = \begin{cases} 0 & \text{if } |c_n| \leq T_S = r \cdot \hat{c}_{j,l}^Y \cdot \sigma \\ c_n & \text{otherwise} \end{cases}$$

The multiplicative factor r is determined as a function of the scale j. For the finest scale (for example j=9), the factor r is equal to 4. For the other scales, the factor r is equal to 3. These factors exhibit a good noise reduction capability for images having a high contrast-to-noise ratio. However, for fluoroscopic images, artifacts are introduced. These artifacts can be avoided by adapting the factor r. In particular, for the coarsest scale (j=1), the factor r can be equal to 0. There is therefore no thresholding. For the finest scale, the factor r can again be equal to 4. And for the other scales, the factor r can be equal to 1.

In a third substep 233 of the spatial filtering step 23, the image $y_n$ is transformed from the curvelet domain to the spatial (matricial) domain by an inverse curvelet transform. For this purpose, the thresholded coefficients are used. The image obtained after temporal filtering and spatial filtering is denoted $z_n$.

Figure 4:
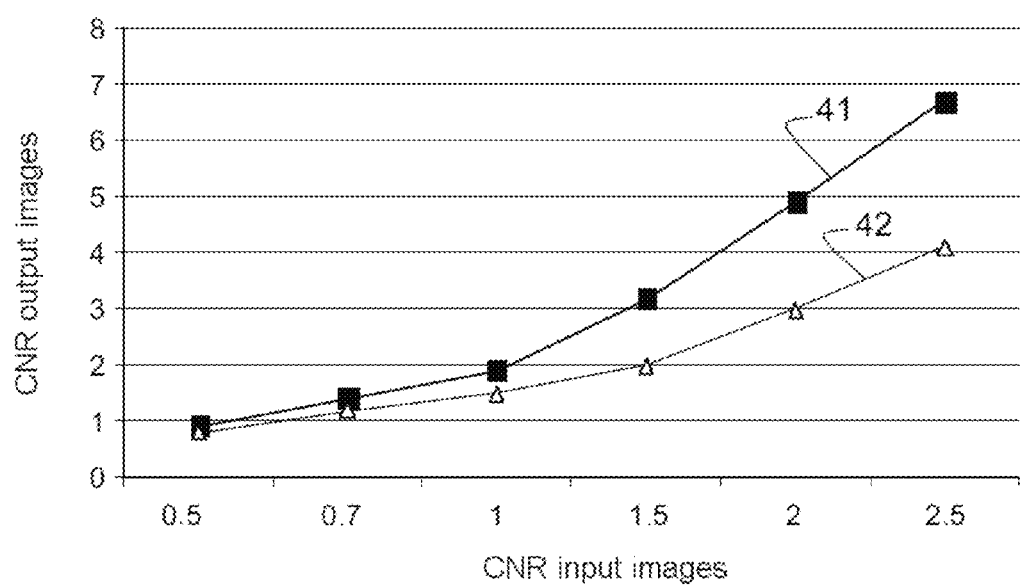
FIG. 4 illustrates, by a graph, the performance of this method for reducing noise for a sequence of fluoroscopic images showing an object having translational and rotational movement.

FIG. 4 illustrates by a graph the performance of the method for reducing noise according to the invention for a sequence of images representing a stent having translational and rotational movement. In the graph, the x-axis represents the average CNR of the sequence of images $x_n$ and the y-axis represents the average CNR of the sequence of images obtained after noise reduction processing. A first curve 41 represents the average CNR of the sequence of images $z_n$ obtained by the method for reducing noise according to the invention, i.e. by temporal filtering followed by curvelet transform spatial filtering. A second curve 42 represents the average CNR of the same sequence of images after processing by the same temporal filtering followed by wavelet transform spatial filtering. The graph shows that for a sequence of images to be processed the CNR of which is relatively low (0.5-0.7-1), the method for reducing noise according to the invention provides a notable improvement in terms of CNR. The noise reduction is even much better for a sequence of images the CNR of which is higher (1.5-2-2.5). Moreover, the method for reducing noise according to the invention makes it possible to significantly reduce the introduction of artifacts.

The spatial filtering step 23 described above makes it possible to effectively reduce the noise level in the images. However, this step has the drawback of introducing artifacts appearing in the form of curvelets, i.e. objects having elongate and wavy shapes. Specifically, these artifacts are due to coefficients having a high amplitude, but only representing noise. They are present only when the noise level is high, which is the case for fluoroscopic images. One solution consists in setting the thresholds relatively low, which reduces artifacts but limits performance in terms of noise reduction. The rest of the description describes another method for performing the spatial filtering step making it possible to significantly reduce the presence of artifacts without reducing the filtering performance. This method relies on the correlation that exists between a given coefficient and the coefficients that are related to it, namely its parent coefficient, its neighbor coefficients and its cousin coefficients. In particular, it is assured that if a coefficient represents useful signal, the coefficients that are related to it have a high probability of also representing useful signal. Conversely, if the modulus of a coefficient is high due to the presence of an artifact, it is not very probable that the coefficients that are related to it will also affected by this artifact.

Figure 5:
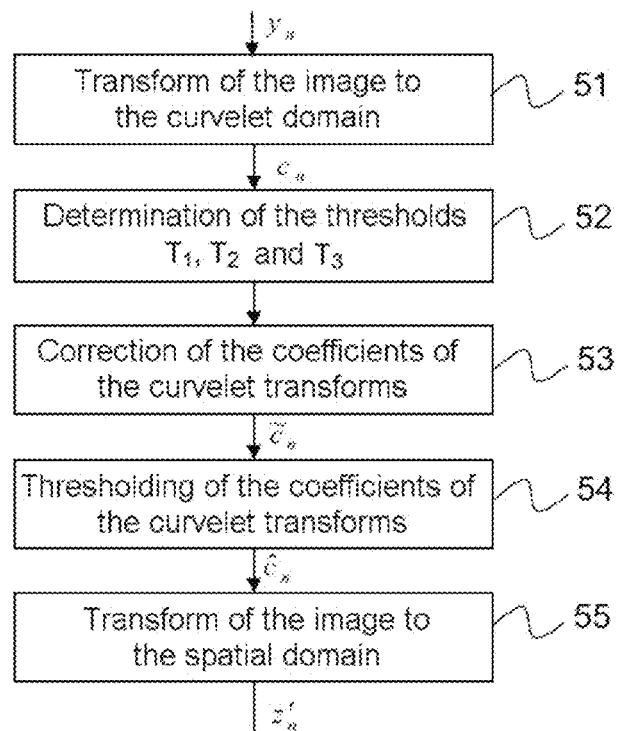
FIG. 5 represents an example of substeps of the method for reducing noise making it possible to perform spatial filtering.

FIG. 5 represents another example of substeps making it possible to perform the spatial filtering step 23. In a first substep 51, the image $y_n$ obtained after temporal filtering is transformed from the spatial domain to the curvelet domain. The curvelet transform of the image $y_n$ is also represented by coefficients denoted $c_n^D(j,l,k)$ or $c_n$ in simplified form. Preferably, the curvelet transform is made with 6 scales and 12 orientations. In a particular embodiment, the image $y_n$ is represented by wavelets for the finest scale, for example for the scale j=5.

In a second substep 52, three thresholds denoted $T_1$, $T_2$ and $T_3$ are determined such that $T_1 < T_2 < T_3$. These thresholds are determined as a function of the standard deviation $\sigma_{s,\theta}$ of the sub-band of the coefficients. The sub-band of a given coefficient $c_n^D(j,l,k)$ groups the set of coefficients having the same scale j and the same orientation l. This is therefore the set of positions for the scale and orientation in question. The thresholds $T_1$, $T_2$ and $T_3$ define a first range of values below the threshold $T_1$, a second range of values between the thresholds $T_1$ and $T_2$, a third range of values between the thresholds $T_2$ and $T_3$, and a fourth range of values above the threshold $T_3$. By way of example, the following threshold values are employed in question: $T_1$=7.5, $T_2$=11.25, and $T_3$=15.

In a third substep 53, the coefficients are corrected as a function of their parent coefficient and their neighbor coefficients. Preferably, only uncorrelated neighbor coefficients are considered. In simplified form $\tilde{c}_n^D(j,l,k)$, or $\tilde{c}_n$, denotes the corrected coefficient. For a given coefficient $c_n^D(j,k,l)$, its parent coefficient is the coefficient corresponding to the previous coarsest scale, i.e. the coefficient $c_n^D(j-1,l,k)$. Its neighbor coefficients are the coefficients $c_n^D(j,l,k')$ corresponding to the neighbor positions k', i.e. to contiguous positions having the same scale and the same orientation. For a position referenced by the pair (x,y), these are therefore the positions (x+1,y), (x−1,y), (x,y+1), (x,y−1), (x+1,y+1), (x+1,y−1), (x−1,y+1) and (x−1,y−1). Neighbor coefficients situated in the direction of the sub-band are qualified as "correlated". For each coefficient $c_n^D(j,l,k)$, the modulus of its parent coefficient and the average of the moduli of its uncorrelated neighbor coefficients are compared with the thresholds $T_1$, $T_2$ and $T_3$. Three cases are to be considered. The first case is that in which the modulus of the coefficient in question $c_n^D(j,l,k)$ is situated either in the same range as the modulus of its parent coefficient $c_n^D(j-1,l,k)$, or in the same range as the average of the moduli of its neighbor coefficients $c_n^D(j,l,k')$. In this first case, the modulus of the coefficient in question remains unchanged ($\tilde{c}_n^D(j,l,k)=c_n^D(j,l,k)$). The second case is that in which the modulus of the parent coefficient $c_n^D(j-1,l,k)$ and the average of the moduli of the neighbor coefficients $c_n^D(j,l,k')$ are situated in the same range, different from that of the modulus of the coefficient in question $c_n^D(j,l,k)$. The modulus of the corrected coefficient $\tilde{c}_n^D(j,l,k)$ then takes the minimum value of the range in which the modulus of the parent coefficient and the average of the moduli of the neighbor coefficients are situated if the modulus of the coefficient in question $c_n^D(j,l,k)$ is situated in a range of lower values, and the maximum value of this range otherwise. The third case is that in which the modulus of the coefficient in question $c_n^D(j,l,k)$, the modulus of its parent coefficient $c_n^D(j-1,l,k)$, and the average of the moduli of its neighbor coefficients $c_n^D(j,l,k')$ are situated in three separate ranges. The modulus of the corrected coefficient $\tilde{c}_n^D(j,l,k)$ then takes the minimum value of the range in which the average of the moduli of the neighbor coefficients is situated if the modulus of the coefficient in question $c_n^D(j,l,k)$ is situated in a range with lower values, and the maximum value of this range otherwise. The third case favors the range of the uncorrelated neighbor coefficients at the expense of the range of the parent coefficient due to the fact that at the coarsest scale, the coefficients do not possess a parent. It would nevertheless be possible to envision correcting the coefficients of the other scales as a function of the range in which the modulus of their parent coefficient is situated.

Figure 6:
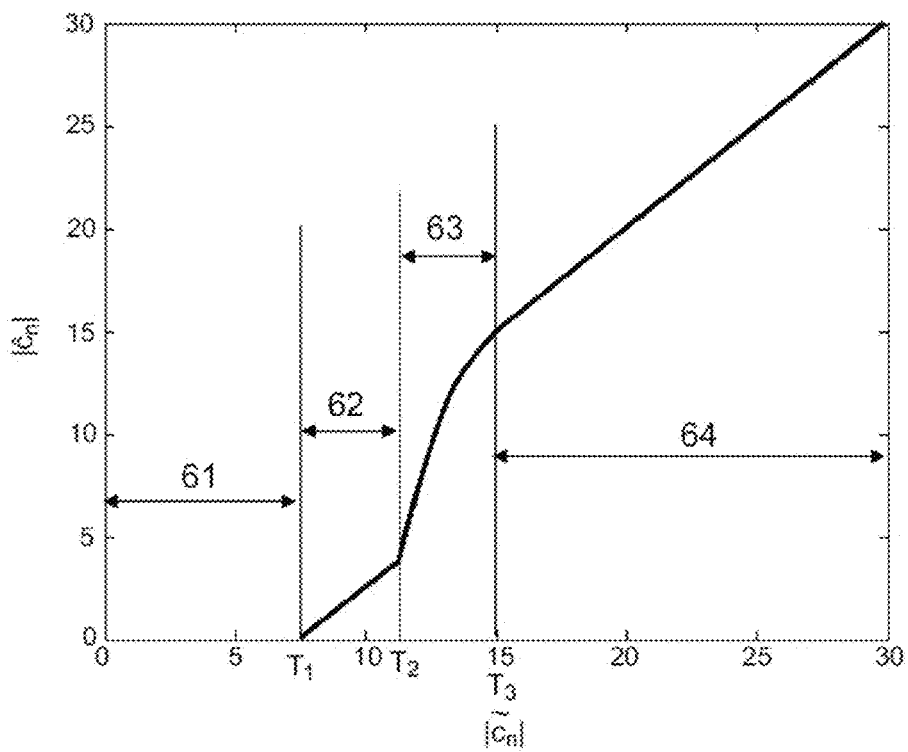
FIG. 6 represents an example of a thresholding function used for the spatial filtering in FIG. 5.

In a fourth substep 54, the corrected coefficients $\tilde{c}_n$ are thresholded by a thresholding function. In simplified form $\hat{c}_n^D(j,l,k)$, or $\hat{c}_n$, denotes the thresholded corrected coefficients. FIG. 6 represents the thresholding function corresponding to the threshold values $T_1$, $T_2$ and $T_3$ in question. This function is modeled as follows:

$$|\hat{c}_n| = \begin{cases} 0 & \text{if } |\tilde{c}_n| < T_1 \\ |\tilde{c}_n| - T_1 & \text{if } T_1 \le |\tilde{c}_n| \le T_2 \\ f(\tilde{c}_n) & \text{if } T_2 \le |\tilde{c}_n| \le T_3 \\ |\tilde{c}_n| & \text{if } |\tilde{c}_n| > T_3 \end{cases}$$

where $f(\tilde{c}_n)$ is a sigmoid defined as follows:

$$f(\tilde{c}_n) = \frac{1}{1 + \exp(-\lambda(\tilde{c}_n - m))}$$

The parameters m and $\lambda$ are determined in such a way that the thresholding function is continuous. They are thus defined as follows:

$$m = \frac{\ln\left(\frac{T_1}{T_2 - T_1}\right)T_3 - T_2 \cdot \ln(0.01)}{\ln\left(\frac{T_1}{T_2 - T_1}\right) - \ln(0.01)}$$

$$\lambda = \frac{-\ln(0.01)}{T_3 - m}$$

The thresholding function therefore cancels the coefficients whose modulus lies in the first range 61, it applies soft thresholding to the coefficients whose modulus is in the second range 62, it applies hard thresholding to the coefficients whose modulus lies in the fourth range 64, and it applies transition thresholding to the coefficients whose modulus lies in the third range 63. The soft thresholding makes it possible to reduce the noise level, but it spreads the outlines. The hard thresholding preserves the outlines well but is less effective in terms of noise reduction. The joint use of these two types of thresholding makes it possible to combine their respective advantages as a function of the range.

When the image $y_n$ is represented by wavelets for the finest scale, the coefficients $\tilde{c}_n$ are thresholded by a hard thresholding function modeled as follows:

$$|\hat{c}_n| = \begin{cases} 0 & \text{if } |\tilde{c}_n| \le T_4 \\ |\tilde{c}_n| & \text{otherwise} \end{cases}$$

where the threshold $T_4$ is defined on the basis of the standard deviation $\sigma_{s,\theta}$ of the sub-band of the coefficient $c_n$ in question:

$$T_4 = 4 \times \sigma_{s,\theta}$$

In a fifth substep 55, the image $y_n$ is transformed from the curvelet domain to the spatial domain by an inverse curvelet transform. For this purpose, the corrected thresholded coefficients are used. The image obtained after temporal filtering and spatial filtering is denoted $z'_n$.

The spatial filtering described with reference to FIG. 5 uses both the parent coefficients and the uncorrelated neighbor coefficients. The spatial filtering could also use the uncorrelated neighbor coefficients, or all the neighbor coefficients. It could also use only the parent coefficients or the neighbor coefficients, or else combine these coefficients with the cousin coefficients. These coefficients are those having the same scale and the same position as the reference coefficient. The spatial filtering could also not contain any substep of correcting the coefficients, the thresholding substep 54 being in this case performed directly on the coefficients $c_n$ of the curvelet transforms.

The invention claimed is:

1. A method for reducing noise in a sequence of fluoroscopic images acquired by an X-ray detector, each image ($x_n$) being formed in the spatial domain by a matrix of pixels, each pixel having a value representative of a signal level, the method comprising the following successive steps for each image ($x_n$):
applying temporal filtering to the image ($x_n$) acquired at an instant n, the application of said temporal filtering comprising the following substeps for each pixel of the image:
determining a difference between the value of the pixel considered in the image ($x_n$) acquired at the instant n and the value of the corresponding pixel in the image ($y_{n-1}$) acquired at an instant n−1 to which the temporal filtering has been applied,
if the difference is below a first predetermined threshold $S_1$, correcting the value of the corresponding pixel with a first set of parameters,
if the difference is above a second predetermined threshold $S_2$, correcting the value of the corresponding pixel with a second set of parameters,
applying spatial filtering to the image ($y_n$) acquired at the instant n, the application of said spatial filtering comprising the following substeps:
transforming the image ($y_n$) acquired at the instant n from the spatial domain into a curvelet domain using a curvelet transform, each image in the curvelet domain being represented by a set of coefficients,
thresholding the coefficients of the image ($y_n$) using a thresholding function, the thresholding function cancelling the coefficients below a third predetermined threshold, and preserving or adjusting the coefficients above the third predetermined threshold,
transforming the image ($y_n$) whose coefficients have been thresholded from the curvelet domain into the spatial domain using an inverse curvelet transform.

2. The method as claimed in claim 1, wherein the step of transforming the image ($y_n$) acquired at the instant n into the curvelet domain uses a curvelet transform with 6 scales.

3. The method as claimed in claim 1, wherein the step of transforming the image ($y_n$) acquired at the instant n into the curvelet domain uses a curvelet transform with 9 scales.

4. The method as claimed in claim 1 one of the preceding claims, wherein the step of transforming the image ($y_n$) acquired at the instant n into the curvelet domain uses a curvelet transform comprising 16 orientations.

5. The method as claimed in claim 1 one of the preceding claims, wherein the step of transforming the image ($y_n$) acquired at the instant n into the curvelet domain uses a discrete curvelet transform via unequally-spaced fast Fourier Transform (USFFT).

6. The method as claimed in claim 1 one of claims 1 to 4, wherein the step of transforming the image ($y_n$) acquired at the instant n into the curvelet domain uses a discrete curvelet transform via wrapping.

7. The method as claimed in claim 1 one of the preceding claims, wherein the thresholding function is a hard thresholding function, wherein the coefficients are cancelled if they are below the third predetermined threshold, and preserved otherwise.

8. The method as claimed in claim 7, wherein the third predetermined threshold $T_S$ is determined by the following successive steps:
creating an image Y of the same dimensions as the image ($y_n$) acquired at the instant n and of uniform value 1 over all pixels,
transforming the image Y using a Fourier transform,
normalizing the amplitude F of the peak in the Fourier transform of the image Y using the relationship:

$$|F| = \frac{6}{5} \frac{F}{\sqrt{M \times P}}$$

where M and P denote the dimensions of the image Y,
transforming the Fourier transform of the image Y from the spatial domain into the curvelet domain using a curvelet transform, each image in the curvelet domain being represented by a set of coefficients $c_{j,l,k}^Y$,
determining a norm $\hat{c}_{j,l}^Y$ for the coefficients $c_{j,l,k}^Y$ using the relationship:

$$\hat{c}_{j,l}^Y = \sqrt{\frac{\sum_l |c_{j,l,k}^Y|^2}{M \times P}}$$

where M and P denote the dimensions of the image Y and l denotes the orientations of the curvelets,
determining the predetermined threshold $T_S$ using the relationship:

$$T_S = r \cdot \hat{c}_{j,l}^Y \cdot \sigma$$

where σ is the standard deviation of the noise in the image ($y_n$) acquired at the instant n and to which the temporal filtering has been applied, and where the factor r takes the value 0 for the coarsest scale of the curvelets, the value 4 for the finest scale and the value 1 for the other scales.

9. The method as claimed in claim 1, wherein the thresholding function applies soft thresholding to the coefficients whose modulus lies between the third predetermined threshold $T_1$ and a fourth predetermined threshold $T_2$, hard thresholding to the coefficients whose modulus is above a fifth predetermined threshold $T_3$ and transition thresholding between the soft thresholding and the hard thresholding to the coefficients whose modulus lies between the fourth predetermined threshold $T_2$ and the fifth predetermined threshold $T_3$, the predetermined thresholds $T_1$, $T_2$ and $T_3$ being such that $T_1 < T_2 < T_3$.

10. The method as claimed in claim 9, wherein the transition thresholding is defined by a sigmoid defined as follows:

$$f(c_n) = \frac{1}{1 + \exp(-\lambda(c_n - m))}$$

where $c_n$ are the coefficients that need to be thresholded, and where the parameters m and λ are determined as follows:

$$m = \frac{\ln\left(\frac{T_1}{T_2 - T_1}\right) T_3 - T_2 \cdot \ln(0.01)}{\ln\left(\frac{T_1}{T_2 - T_1}\right) - \ln(0.01)}$$

$$\lambda = \frac{-\ln(0.01)}{T_3 - m}.$$

11. The method as claimed in claim 10, wherein the step of applying spatial filtering furthermore comprises, prior to the thresholding substep:
a substep of correcting the coefficients as a function of their parent coefficient, of their neighbor coefficients and/or of their cousin coefficients, the parent coefficient of a given coefficient $c_n^D(j,l,k)$ being the coefficient $c_n^D(j-1,l,k)$ having the same orientation and the same position as the given coefficient on the previous coarsest scale j−1, its neighbor coefficients being the coefficients $c_n^D(j,l,k')$ corresponding to the contiguous positions for the position of the given coefficient and having the same scale and the same orientation, the cousin coefficients being the coefficients having the same scale and the same position as the given coefficient.

12. The method as claimed in claim 11, wherein a first range of values is defined for the values below the third predetermined threshold $T_1$, a second range of values is defined between the third predetermined threshold $T_1$ and the fourth predetermined threshold $T_2$, a third range of values is defined between the fourth predetermined threshold $T_2$ and the fifth predetermined threshold $T_3$ and a fourth range of values is defined for the values above the fifth predetermined threshold $T_3$, the substep of correcting the coefficients applying the following corrections:

when the modulus of the coefficient in question $c_n^D(j,l,k)$ is situated either in the same range as the modulus of its parent coefficient $c_n^D(j-1,l,k)$ or in the same range as the average of the moduli of its neighbor coefficients $c_n^D(j,l,k')$, the modulus of the corrected coefficient $\tilde{c}_n^D(j,l,k)$ takes the value of the modulus of the coefficient $c_n^D(j,l,k)$, when the modulus of the parent coefficient $c_n^D(j-1,l,k)$ and the average of the moduli of the neighbor coefficients $c_n^D(j,l,k')$ are situated in the same range, different from that of the modulus of the coefficient in question $c_n^D(j,l,k)$, the modulus of the corrected coefficient $\tilde{c}_n^D(j,l,k)$ takes the minimum value from the range in which the modulus of the parent coefficient and the average of the moduli of the neighbor coefficients are situated if the modulus of the coefficient in question $c_n^D(j,l,k)$ is situated in a range with lower values, and the maximum value from this range otherwise, when the modulus of the coefficient in question $c_n^D(j,l,k)$, the modulus of its parent coefficient $c_n^D(j-1,l,k)$ and the average of the moduli of its neighbor coefficients $c_n^D(j,l,k')$ are situated in three separate ranges, the modulus of the corrected coefficient $\tilde{c}_n^D(j,l,k)$ takes the minimum value from the range in which the average of the moduli of the neighbor coefficients is situated if the modulus of the coefficient in question $c_n^D(j,l,k)$ is situated in a range with lower values, and the maximum value from this range otherwise.

13. The method as claimed in claim 1, wherein the step of applying the temporal filtering to the image acquired $(x_n)$ at the instant n comprises, following the substep of determining the difference between the value of the pixel in question in the image $(x_n)$ acquired at the instant n and the value of the corresponding pixel in the image $(y_{n-1})$ acquired at the instant n−1 to which the temporal filtering has been applied, the following additional substep:

if the difference lies between the first predetermined threshold $S_1$ and the second predetermined threshold $S_2$, correcting the value of the corresponding pixel with a third set of parameters.

* * * * *